Dec. 2, 1969 H. ZIRNGIBL ET AL 3,481,703

PROCESS FOR CONVERTING METAL HALIDES INTO THEIR OXIDES

Filed March 23, 1966

INVENTORS:
HANS ZIRNGIBL, WALTER GUTSCHE.
BY
Burgers, Dinklage, + Sprung

United States Patent Office 3,481,703
Patented Dec. 2, 1969

3,481,703
PROCESS FOR CONVERTING METAL HALIDES INTO THEIR OXIDES
Hans Zirngibl, Duisburg, and Walter Gutsche, Krefeld-Bockum, Germany, assignors to Farbenfabriken Bayer Aktiengesellschaft, Leverkusen, Germany, a corporation of Germany
Filed Mar. 23, 1966, Ser. No. 536,728
Claims priority, application Germany, Mar. 24, 1965, F 45,614
Int. Cl. C01g 23/04, 49/02
U.S. Cl. 23—202                                        6 Claims

ABSTRACT OF THE DISCLOSURE

Thermal decomposition of inorganic halides, e.g., of iron, aluminum, silicon, titanium, zirconium, or magnesium, with a reaction gas, e.g., oxygen and/or steam-containing gases, by heating an inert gas, e.g., nitrogen, chlorine, noble gas, and/or carbon dioxide, in a blown high-pressure high-voltage arc, thereafter mixing the so-heated inert gas with the halide and reaction gas and initiating the thermal decomposition reaction by maintaining a theoretical mixing temperature of at least 800° C.

---

This invention relates to a process for converting metal halides into their oxides.

The invention is particularly concerned wth the producton of the inorganic oxides of Ti, Al, Zr, Si or Fe, by reaction of the corresponding halides with oxygen, gas mixtures containing free oxygen and/or with steam in the gas phase at high temperature. In these processes, the oxides are formed with such a particle size to be suitable as pigments or fillers. Free halogens and/or hydrogen halides are formed as by-products. The concentration of the halogen in the waste gases is so high that, after dust removal, it can be used again for the production of new halides without further working up.

Most of the processes described in the literature for reacting halides (and more especially $TiCl_4$) with oxygen or steam in the gas phase to form the corresponding oxides can be divided into three groups as regards their production conditions:

(1) Separate indirect preheating of the reactants is effected to such temperatures that reaction takes place spontaneously on mixing.

(2) Decomposition of the halide with $O_2$ is effected in an auxiliary flame supplying energy and possibly steam, the said flame preferably being fed with CO or hydrobarbons.

(3) Reaction of the reactants is effected in a fluidized or fluid bed of inert material which is heated by direct or indirect means.

The present invention relates to a process of Type 1.

Quite recently, processes have become known which are concerned with the indirect or direct heating of the reactants in high current arcs. For such purposes, a so-called "plasma donor" or "plasma generator" is used, in which an arc is struck between a cooled copper anode and a similarly cooled tungsten cathode, the gas to be heated being blown through the arc. By this method simultaneously a stabilization of the arc and a strong heating up of the reactants is achieved, leaving the burner as a brightly luminous "plasma" and having temperatures up to 30,000° K., the actual temperature depending on the ratio between electric power and gas throughput. The plasma generally consists of molecules, atoms, ions and electrons, which are in thermal equilibrium with one another at atmospheric pressure. Such a plasma has recently been referred to as a high-pressure plasma. All plasma burners are generally operated at relatively low direct voltages, which depend on the type of gas and amount at most to about 100 volts. For high efficiency it is consequently necessary to have very high current densities of several hundred to several thousand amps. In this connection, two particular problems arise, namely:

(1) Rapid burning away of the electrodes, especially with the heating of chemically aggressive or oxidizing gases, and (2) Unsatisfactory utilization of the electrical energy on account of the necessary intensive cooling of the electrodes.

Due to the strong corrosion of the electrodes by the hot oxygen or the halides usually only inert gases are brought to the desirable high temperature in the plasma burner thereafter mixing them with the reactants. In this case, the reaction starts instantaneously due to the great increase in temperature. Nitrogen is generally used as the inert gas.

However, even with this method, the electrodes have only a very limited life. The heat loss amounts to about 40 to 60%. Furthermore, impurities in the product can result from the burned off electrodes.

The present invention provides a process for the thermal decomposition of inorganic halides with oxygen- and/or steam-containing gases which comprises heating a gas which is inert in the reaction in a blown high-pressure high-voltage arc—as herein defined—thereafter mixing this heated inert gas with the reactants and initiating the reaction by maintaining a theoretical mixing temperature of at least 800° C. With this process, the corresponding oxides and elementary halogens and/or hydrogen halides are produced at temperatures above 800° C. and the necessary thermal energy is supplied to the reactants by the conversion of electrical energy.

The blown high-voltage arc has a burning potential which is higher by orders of magnitude than that of a normal arc (high-pressure arc) operated at atmospheric pressure. By blowing an arc axially, radially or tangentially with a gas which is cold in relation to the arc temperature, it is possible so to reduce the charge carrier concentration in the arc column that the column resistance rises strongly. By this means, the arc can be operated in stable manner with potentials of several thousand volts and simultaneously a gaseous medium can be heated to high temperatures in the shortest possible time. In order to operate the arc with the same powers as the plasma burner, current intensities, which are lower by the factor 10 to 100 than with the said burner, are sufficient. As a result, the electrode current density in the focal spot is substantially lower, this leading to a considerably increased life of the metal electrodes. In proportion to the total arc energy, the energy becoming free in the regions of the anode and cathode, i.e., the energy drop, is small. This energy, which is transformed in the immediate vicinity of the electrodes or on the electrodes themselves into heat, decisively determines the heat losses occurring due to cooling of the electrodes. In order that the ratio between the energy drop and total energy may be kept small in the blown arc, the heat losses can be lowered by cooling to below 20%.

For carrying out the process according to the invention, it is expedient to use a tangentially blown arc, which burns axially of two hollow electrodes separated by an insulator. The arc can be operated with direct voltage or with alternating voltage. When operating with alternating voltage, either high frequencies must be used, or the gas or gas mixture which is to be heated and which hereinafter will be referred to as working gas must have been preheated beforehand in conventional manner to 600 to 700° C.

In order to strike the arc, the cathode and anode are short-circuited by means of an auxiliary electrode, which is later retracted. A sufficiently high auxiliary voltage from a separate igniting device can be super-imposed on the direct voltage of the current supply arrangement, so that an igniting spark jumping between the electrodes initiates the arc.

The working gas is introduced into the upper electrode, or tangentially into the burner through bores in the insulator, and flows in a helically progressing vortex to the open end of the burner tube, leaving it at the required temperature. The arc burning in the axis of the tube preferentially heats the working gas flowing in its vicinity, while the working gas sweeping along the walls of the tube remains relatively cold and even also contributes to cooling the electrode. The heat loss is decreased by this means, since the water cooling of the electrodes can be reduced.

A preferred apparatus for carrying out the process of the invention is shown in the accompanying drawings, in which.

Figure 1:
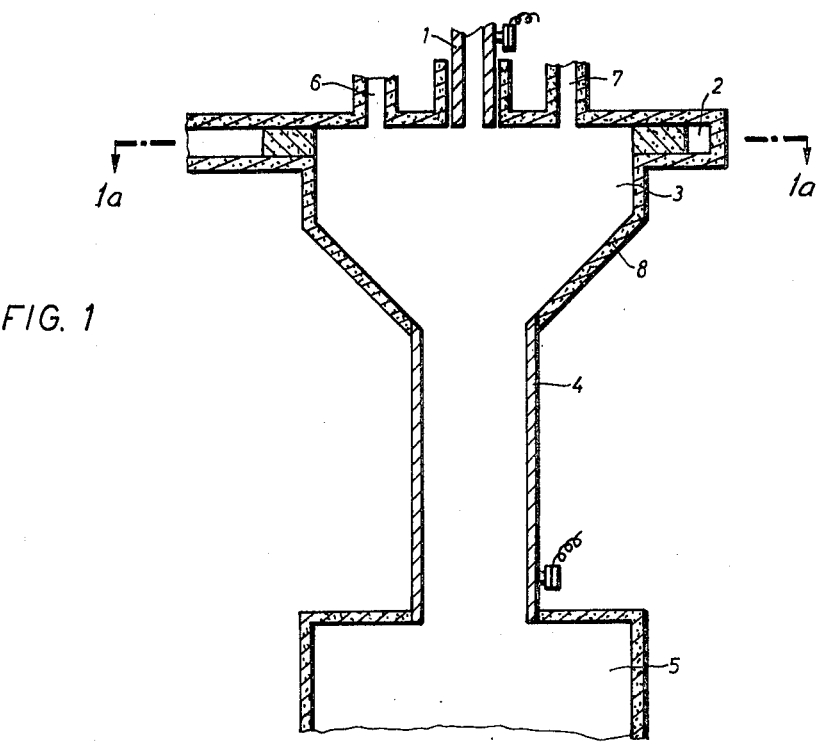
FIGURE 1 is a sectional elevation of the apparatus.
Figure 1A:
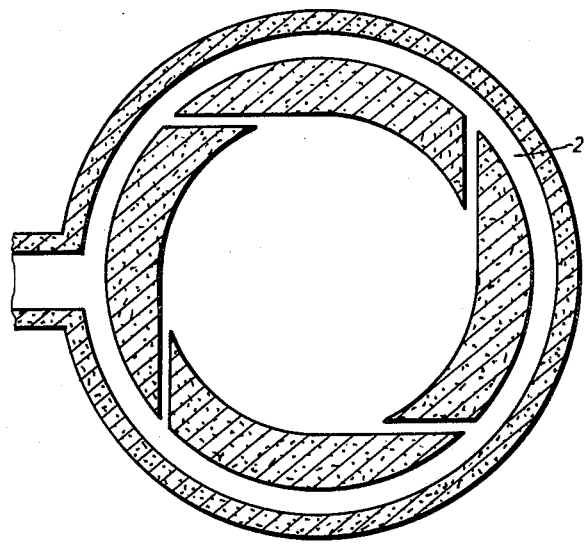
FIGURE 1a is a sectional view along line 1a—1a of FIG. 1 in the direction shown.

In these figures, the references 1 and 4 represent the two tubular electrodes. The electrodes are water-cooled but the cooling jacket is not shown in the drawing. The arc ignited between the electrodes by means of an auxiliary electrode (not shown) or by a thin wire connecting the two electrodes burns mainly in the centre of chamber 3, the walls of which are formed by an insulating intermediate element 8. The working gas enters the burner chamber 3 via distribution chamber 2 through tangential bores or slots. It is also possible for additives to be supplied to the working gas through bores 6 and 7. Connected to the lower electrode 4 is a mixing chamber 5, the construction of which is described below.

Of course, various other forms of burner are possible. For example, the burner tube can be used only for conveying gas and two electrodes can project in insulated manner from both ends centrally into the tube and the arc can be struck between them. It is also possible to cause the arc to jump to the tubular electrode from a second electrode which is fixed coaxially and in insulated manner in said tubular electrode. Instead of causing the working gas to flow in vortex form through the tube, it can be so guided that it sweeps past the arc in the direction of the tube axis. Finally, the arc between two electrodes let into the cylindrical tube wall can be made to extend perpendicularly to the tube axis, while the working gas flows in the axial direction and causes the arc to be widened in hairpin form by being blown on radially. Other cross-sections in addition to the circular cross-section for the burner tube are also possible, such as square, rectangular, elliptical or polygonal sections. In addition, it is not necessary that the burner tube or the electrodes have the same cross-section over the entire axial length, but the said tube can for example taper or widen out in funnel formation or have a widened chamber internally thereof. All this naturally also applies to the insulating intermediate element.

Any relevant metal is suitable as electrode material, provided it does not have too low a melting point and its heat-conduction power is good. Also, carbon or graphite semi-conducting ceramic substances such as $MoSi_2$, $SiC$, $ZrSi_2$, $Ti_2O_3$ or Cermets, can be used, but copper, tungsten and graphite are preferred.

It is preferred to use $N_2$ as working gas, but in addition the inert gases, i.e. noble gas, $CO_2$ or halogens (especially $Cl_2$) can be used. The quantity of the working gas depends on the conditions of the reaction (dilution) and the burner dimensions. In general, 2 to 60% of working gas, and advantageously 10 to 40%, based on the total gas quantity, are sufficient.

The axial velocity of the hot gas in the tube should be from 100 to 1,000 m./sec., while the gas introduced tangentially into the inlet nozzles has a velocity of at least 40 m./sec.

The gas temperature advantageously is 2,000 to 10,000° C. and the specific energy density is 1 to 10 kwh./$Nm.^3$.

The thermal efficiency is 70 to 90%, i.e., 70 to 90% of the electrical energy supplied is transferred to the gas.

Furthermore, it is expedient to cause the arc to rotate by means of a magnetic field, because in this way the burning away of the electrode is further reduced. The magnetic field is generated by a coil through which direct current flows and which surrounds one or both electrodes.

The insulating material depends on the conduction of the reaction. If the inert gas is initially heated up in conventional manner in heat exchangers or nested tube heaters to temperatures of 500 to 700° C., the insulator must be selected of a material that it maintains its insulating properties at high temperatures. Especially suitable for this purpose are quartz, sintered corundum, sintered magnesia and hexagonal boron nitride, the last mentioned being of particular advantage because it can be more easily worked. Porcelain and steatite are only suitable when they are indirectly cooled. Generally speaking, the problems of insulation increase with increasing working temperatures, and also with rising working voltages.

Where it is possible for the inert gas to be preheated before entering the burner, the reactants can also be preheated to conventionally possible temperatures before they are mixed with one another or with the hot inert gas. For example, $TiCl_4$ can be preheated in suitable heat exchangers to 450° C. and the oxygen or the oxygen-containing gas mixture can, in certain circumstances, even be heated to 600° C. Both components can also be mixed beforehand and heated to a temperature which is still below the reaction temperature, e.g., 450° C. with $TiCl_4+O_2$.

The supply of energy and gas to the burner must be so controlled that, when finally mixing all the reacting and nonreacting components, the temperature is sufficient to initiate the reaction with the appearance of flame thereby maintaining the required reaction temperature. In order to achieve a complete reaction with $TiCl_4$, this mixing temperature must be between 800 and 1100° C. and preferably between 900 and 1000° C.

A number of possibilities exists for carrying out the mixing operation. For example, the two gaseous reactants preheated to medium temperatures can first of all be separately mixed with the hot inert gas and then allowed to enter the reaction chamber from two concentric tubes. By suitable choice of the tube diameter, the discharge cross-sections for both gas mixtures will be so chosen that the said mixtures discharge in parallel relation but at very different speeds and are thereby mixed.

On the other hand, the mixing can be so carried out by premixing both reactants with inert gas and causing them to discharge at an angle to one another from two nozzles, so that both streams meet one another and become mixed at some distance from the nozzles. Finally, both reactants can enter a mixing chamber tangentially, or one can enter the chamber tangentially and the other radially or axially, a particularly intimate mixing being produced by the vortex movement which is set up. With tangential entry of one or both reactants, it is expedient for the walls of the mixing chamber to be made conical, since then there is a repeated deflection of the gas streams, caused by a return flow leading to the centre of the chamber. Finally, if all three components, inert gas and reactants, are brought together in a common chamber, any of these forms of mixing can be used separately or combined with one another.

The halides and advantageously the chlorides of the elements iron, aluminum, silicon, titanium, zirconium and magnesium are suitable for the thermal cracking. The present process is particularly suitable for the thermal decomposition of TiCl₄ and oxygen-containing gases.

In many cases, in which value is attached to certain and uniform particle sizes of the oxides, it has proved to be necessary for the reactants to have so-called nuclei formers admixed therewith before or during the reaction. These are, for example, small quantities of steam and, especially in the production of $TiO_2$ from $TiCl_4$, particularly also $SiCl_4$ and lower titanium halides as well as titanates and organic compounds containing hydrogen. In addition, radical formers, such as $NO_2$ and organic or inorganic peroxides, as well as finely divided oxides, can also be used. Where preliminary reactions are not to be feared or are desired, these substances can be distributed in one or both of the reaction components and/or the inert gas. Otherwise, they can be injected directly into the reaction zone. The grain size can often be controlled by diluting the reaction gases with an inert gas. For this purpose, advantageously the gas of the arc burner is used, the quantity thereof being suitably adjusted.

The reaction temperature must be so high that, as far as possible, complete reaction of the reactants takes place. With $TiCl_4$, it is expedient to maintain temperatures between 800 and 2000° C.

The residence time of the reaction gases or of the reaction mixture in the reaction chamber depends on the reaction temperature, but should be from 0.05 to 1 second. The reaction mixture can be worked up in the usual way. It is quenched, either immediately after leaving the reactor or after interposition of a secondary reaction chamber and is thereafter worked up to solid and gaseous reaction products. After the oxides obtained have been subjected to the usual after-treatments, such as removal of any halogen or hydrogen halide still adhering, or coatings for improving the dispersability, light stability and chalking resistance, they can be used as pigments and fillers.

After dust removal, the reaction gases can be used again for chlorinating fresh starting material or, when using water-containing gases for the cracking, they can be worked up for example to hydrochloric acid.

The following examples illustrate the invention:

EXAMPLE 1

In a burner of the form shown in FIGURE 1, having water-cooled electrodes made of copper and an intermediate section 8 of quartz material, the anode of which was enclosed by a copper coil having 60 turns, 6.0 cubic meters of nitrogen per hour (at n.t.p.) were injected at 20° C. and tangentially at 2. The arc was operated with a power of 13.5 kw. A current of 100 amps flowed through the coil. The hot nitrogen was introduced axially into a mixing chamber situated beneath the burner, while a mixture of 33.4 kg. of gaseous titanium tetrachloride, 0.4 kg. of gaseous aluminum chloride and 6 cubic meters (at n.t.p.) of oxygen were introduced tangentially into said chamber. The gas mixture had a temperature of 200° C. The indicated throughputs are related to a time period of 1 hour. The mixing chamber was made of aluminum and was cooled by silicone oil.

The temperature of the reacting mixture, measured just behind the mixing chamber, was 1180° C.

14.0 kg. per hour of $TiO_2$, which had an excellent brightening and covering power and a very good degree of whiteness were formed in the cyclones and cloth filters arranged on the output side. The rutile content of the product was 100%, based on the total $TiO_2$ content, and the grain size was $0.27\mu$.

An average of 49.0% of chlorine, 11.7% of oxygen and 39.3% of nitrogen was found in the waste gas.

EXAMPLE 2

In a burner similar to that of Example 1, but the dimensions of which were somewhat altered, 3.6 cubic meters (at n.t.p.) of nitrogen per hour were heated by an arc operated with a power of 15.8 kw. The magnetic coil which surrounded the anode was again supplied with 100 amps. A mixture of 38.4 kg. per hour of titanium tetrachloride, 6.0 cubic meters (at n.t.p.) per hour of oxygen and 0.4 kg. per hour of aluminum chloride was injected radially into the cylindrical mixing chamber situated beneath the burner. The temperature of the mixture was 200° C. The nitrogen heated in the burner flowed axially through the mixing chamber. After leaving the outlet the temperature of the reaction gases from the mixing chamber was 1410° C. Thereafter, the gases were cooled to 600° C. by admixture of returned, cold and dust-free waste gas.

15.9 kg. of $TiO_2$ per hour were obtained. The product has a rutile content of 99%, a grain size of $0.22\mu$, a very good degree of whiteness and an excellent brightening power.

EXAMPLE 3

7.35 cubic meters/hour (at n.t.p.) of nitrogen were heated in an arc burner according to FIGURE 1 and having a magnetic coil around the anode. The burner power was 15.3 kw. The hot nitrogen was conducted axially through a cylindrical mixing chamber, into which 34.6 kg./hour of $TiCl_4$, 0.27 kg./hour of $AlCl_3$ (both in gaseous form) and 4.6 cubic meters (at n.t.p.) of $O_2$ per hour were introduced radially through separate inlet ducts. The temperature of the inflowing reaction components was 200° C. Just behind the mixing chamber, the temperature was 1250° C. The cooling of the hot suspension was effected as in Example 2. $TiO_2$ was obtained in a quantity of 13.8 kg./h. The product showed excellent brightening and covering power and had a rutile content of 100%, based on total $TiO_2$. Its grain size was $0.24\mu$.

EXAMPLE 4

In the burner according to Example 1, 6.0 cubic meters (at n.t.p.) of $N_2$ per hour were heated by an arc of 12.1 kw. power. A hot mixture of 40.2 kg. per hour of gaseous $SiCl_4$ and 6.35 cubic meters (at n.t.p.) of $O_2$ per hour and at a temperature of 200° C. were blown tangentially into the mixing chamber situated beneath the burner and mixed with the hot nitrogen flowing in the axial direction. Below the mixing chamber, a reaction temperature of 1320° C. was set up. The suspension was thereafter cooled with cold return gas to below 600° C. 35.9 kg. of very loose, light and pure white product were obtained every hour in the cyclones and dust filters, this product consisting of 99.5% of $SiO_2$ and having a mean particle size of $0.06\mu$. The chlorine content of the waste gas was on average 59%.

EXAMPLE 5

4 cubic meters (at n.t.p.) of nitrogen per hour were heated in a burner by an arc with a power of 22.0 kw. 6.55 cubic meters (at n.t.p.) of $O_2$ per hour and 48.7 kg. of gaseous $FeCl_3$ per hour (both heated to 350° C.) were separately introduced through tangential inlet ducts into the iron mixing chamber situated beneath the burner and mixed with the hot $N_2$. The reacting gas mixture left the mixing chamber at a temperature of 1340° C. and was thereafter cooled by returned cold waste gas. Every hour, there were obtained 23.2 kg. of finely divided $Fe_2O_3$ with a mean particle size of $0.4\mu$ and this substance was excellently suitable for use as a pigment because of its covering power and color intensity.

EXAMPLE 6

4.0 cubic meters (at n.t.p.) per hour of $N_2$ were heated in an arc burner, which was operated at a power of 20.2 kw. 7.85 kg. per hour of steam and 33.6 kg. per hour of $SiCl_4$ (both at 200°) were mixed in the cylindrical mixing chamber situated beneath the burner with the axially introduced hot nitrogen. The reactants were blown separately through radial ducts into the mixing chamber. The resulting reaction temperature, measured just behind the mixing chamber, was 1010° C. 11.6 kg. per hour of $SiO_2$ with an average particle size of $0.05\mu$ and a bulk weight of 0.08 kg./l. were separated out in the cyclones and dust filters. The HCl content of the waste gas was 76.7%.

What we claim is:

1. Process for the thermal decomposition of inorganic halide selected from the group consisting of a halide of a metal selected from the group consisting of iron, aluminum, silicon, titanium, zirconium, and magnesium, with a corresponding reaction gas selected from the group consisting of oxygen-containing gas and steam-containing gas, which comprises heating a gas which is inert to the reaction and which is selected from the group consisting of nitrogen, chlorine, a noble gas, carbon dioxide, and mixtures of such gases, in a tangentially blown high-pressure high-voltage arc operated at an energy density of between about 1–10 kwh./Nm.$^3$ to a temperature between about 2,000–10,000° C. by introducing such inert gas tangentially at a velocity of at least about 40 m./sec. into said arc, thereafter mixing such heated inert gas with such inorganic halide in the form of a gas and such reaction gas by introducing said heated inert gas axially at a velocity between about 100–1,000 m./sec. into a reaction zone and into mixing contact with said inorganic halide and such reaction gas being introduced into said reaction zone, said inert gas being used in a quantity of between about 2–60% by volume based on the total quantity of halide, reaction and inert gases used, to achieve mixing of said heated inert gas with said halide gas and reaction gas and initiation of the thermal decomposition reaction by maintaining a theoretical mixing temperature of at least 800° C. and carrying out the thermal decomposition in said zone for a residence time of the reactants between about 0.05–1 second.

2. Process according to claim 1 wherein said halide and reaction gas are correspondingly preheated to temperatures below their temperature of reaction before being mixed with said heated inert gas.

3. Process according to claim 1 wherein said arc is caused to rotate by applying a magnetic field thereto.

4. Process according to claim 1 wherein said quantity of inert gas is between about 10–40% by volume.

5. Process according to claim 1 wherein said halide is titanium tetrachloride and said reaction gas is selected from the group consisting of oxygen and free oxygen-containing gas, and upon thermal decomposition, titanium dioxide is formed.

6. Process according to claim 5 wherein a titanium dioxide nuclei-forming additive is additionally present during the thermal decomposition.

References Cited

UNITED STATES PATENTS

| | | | |
|---|---|---|---|
| 2,858,411 | 10/1958 | Gage | 204—164 X |
| 3,004,137 | 10/1961 | Karlovitz | 204—164 X |
| 3,042,830 | 7/1962 | Orbach | 204—164 X |
| 3,051,639 | 8/1962 | Anderson | 204—164 X |
| 3,114,691 | 12/1963 | Case | 204—164 X |
| 3,275,411 | 9/1966 | Freeman et al. | |
| 3,275,412 | 9/1966 | Skrivan | 23—140 X |

HERBERT T. CARTER, Primary Examiner

U.S. Cl. X.R.

23—21, 140, 142, 182, 200, 201; 204—164